(12) United States Patent
Haber

(10) Patent No.: US 7,031,345 B1
(45) Date of Patent: Apr. 18, 2006

(54) METHOD AND SYSTEM FOR RATE ADAPTIVE ISDN COMMUNICATION

(75) Inventor: Richard C. Haber, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 09/746,298

(22) Filed: Dec. 21, 2000

(51) Int. Cl.
*H04J 1/02* (2006.01)

(52) U.S. Cl. ...................... 370/493; 370/419

(58) Field of Classification Search ........... 370/464, 370/468, 493, 494, 495, 437
See application file for complete search history.

(56) References Cited

U.S. PATENT DOCUMENTS

| | | | |
|---|---|---|---|
| 5,023,869 A | 6/1991 | Grover et al. | 370/84 |
| 5,121,390 A | 6/1992 | Farrell et al. | 370/94.1 |
| 5,852,630 A * | 12/1998 | Langberg et al. | 375/219 |
| 5,886,989 A | 3/1999 | Evans et al. | 370/347 |
| 5,889,856 A * | 3/1999 | O'Toole et al. | 375/399.02 |
| 5,931,928 A | 8/1999 | Brennan et al. | 710/68 |
| 6,031,848 A | 2/2000 | Brennan | 370/522 |
| 6,118,796 A | 9/2000 | Best et al. | 370/524 |
| 6,151,312 A | 11/2000 | Evans et al. | 370/338 |
| 6,208,640 B1 | 3/2001 | Spell et al. | 370/358 |
| 6,546,024 B1 * | 4/2003 | Sharper et al. | 370/470 |
| 6,570,915 B1 * | 5/2003 | Sweitzer et al. | 375/225 |
| 6,625,777 B1 * | 9/2003 | Levin et al. | 714/774 |
| 6,628,704 B1 | 9/2003 | Long et al. | 375/219 |
| 6,804,267 B1 | 10/2004 | Long et al. | 370/524 |

* cited by examiner

*Primary Examiner*—Duc Ho
*Assistant Examiner*—Thien Tran
(74) *Attorney, Agent, or Firm*—Baker Botts L.L.P.

(57) ABSTRACT

A method for communicating data according to ISDN protocol includes connecting a first IDSL line interface to a second IDSL line interface at a location remote from the first IDSL line interface, the first IDSL line interface having a first bit rate, and the second IDSL line interface having a second bit rate. The method also includes transmitting data between the first IDSL line interface and the second IDSL line interface, determining that a CRC level associated with the data transfer exceeds a predetermined acceptable level, and lowering the second bit rate until a CRC level associated with subsequent data transfer between the first and second IDSL line interfaces meets or falls below the predetermined acceptable level.

25 Claims, 2 Drawing Sheets

METHOD AND SYSTEM FOR RATE ADAPTIVE ISDN COMMUNICATION

BACKGROUND OF THE INVENTION

Data communication is becoming increasingly important in today's society. A prevalent use of data communications occurs between a person located at home seeking to interact over the Internet with remote computers. Conventionally, connections between the person's home computer and the remote computers through the Internet take place over conventional telephone wires. Such communications are limited in speed, resulting in less than desirable data communication.

Various alternatives to such communications have been implemented. One group of techniques utilizes existing telephone lines, but with improved digital transmission technology that allows communication of data at higher speeds. One example is a synchronous digital subscriber line technology (ADSL). According to ADSL, bandwidth available on existing telephone wires is utilized at higher frequencies than standard voice communication. Other techniques involve introducing alternative media connections between the home user and remote computers for use on the Internet. One example is the use of cable. Another involves special telephone lines, such as ISDN. An ISDN line transmits data digitally, rather than in analog form. An ISDN telephone line uses existing copper telephone wire, but requires special ISDN digital switches.

Communication over traditional phone lines conventionally uses a modem. A modem stands for modulator/demodulator and enables a computer to transmit information over a standard telephone line. Because a computer is digital and a conventional telephone line is analog, modems are needed to convert digital to analog and vice versa. In the case of ISDN, no analog to digital conversion is required. However, devices known as ISDN Terminal Adapters and ISDN Routers are used to communicate with the phone company ISDN line interfaces and other ISDN devices.

ISDN lines utilize two main types of channels: a B channel, which carries data at a rate of 64 kilobytes per second (Kbps) and a D channel, which carries control information at 16 Kbps. Basic Rate Interface (BRI) ISDN lines include two B channels. These two B channels then combine to transmit data at 128 Kbps. However, some lines utilize the additional 16 Kbps D channel to transfer for a total of 144 Kpbs of data.

Establishing a connection between two IDSL line interfaces is often problematic. Both because the bandwidth of the particular ISDN line utilized may vary and because a bit rate of either line interface at the customer premises or the remote location may differ. Conventionally, in order to set up an IDSL router at a customer's premises, a technician or user had to call the central office and determine the bit rate applicable to the corresponding IDSL line interface at the central office. Such a procedure is time consuming and cumbersome.

SUMMARY OF THE INVENTION

Accordingly, a need has arisen for a method and system for rate adaptive ISDN communication. The present invention provides a method and system for rate adaptive ISDN communication that addresses shortcomings of prior systems and methods.

According to one embodiment of the invention, an IDSL line card includes at least one line interface having an adjustable bit rate. The line card includes a microcontroller operable to control a bit rate associated with the at least one IDSL line interface. The microcontroller includes a processor and a memory associated with the processor storing a rate adapter application. The rate adapter application is operable, when executed on the processor, to receive an error level associated with transfer of data through at least one IDSL line interface, determine that the received error level exceeds a maximum error level, and in response to determining that the maximum error level is exceeded, adjust the bit rate for at least one IDSL line interface and determine that a resulting error level falls below the maximum error level.

According to another embodiment of the invention, a method for communicating data according to ISDN protocol includes connecting a first IDSL line interface to a second IDSL line interface at a location remote from the first IDSL line interface, the first IDSL line interface having a first bit rate, and the second IDSL line interface having a second bit rate. The method also includes transmitting data between the first IDSL line interface and the second IDSL interface, determining that a CRC level associated with the data transfer exceeds a predetermined acceptable level, and lowering the second bit rate until a CRC level associated with subsequent data transfer between the first and second IDSL line interfaces meets or falls below the predetermined acceptable level.

Embodiments of the invention provide numerous technical advantages. For example, some embodiments of the present invention allow automatically adapting the bit rate at which an IDSL line interface will transfer data until such data communication occurs with an acceptable amount of error. Such automation allow for more rapid and less cumbersome setup of IDSL communications, for example, a home office and a central office.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 1:
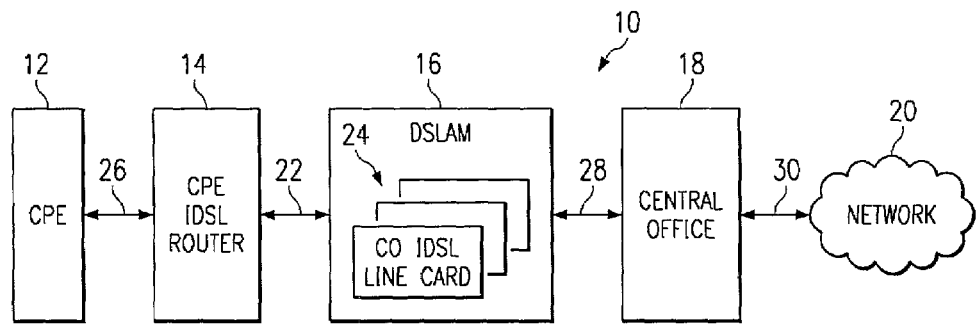
FIG. 1 is a block diagram of a communications system implementing an automatic rate adapter according to the teachings of the present invention.

FIG. 1 is a block diagram of a communications system 10 according to the teachings of the invention. Communications system 10 allows communication between a user and a communications network over ISDN lines.

Communication system 10 includes customer premises equipment 12 and a customer premises equipment IDSL router 14. Customer premises equipment 12 may include, for example, a personal computer. Customer premises equipment IDSL router 14 performs necessary conversions and translations of data received from customer premises equipment 12 to allow communication over an IDSN line. An example of a customer premises equipment IDSL router is Cisco Model No. 802, available from Cisco Systems. Communication system 10 also includes a digital subscriber line access multiplexor 16 in communication with or located within a central telecommunications office 18. Central telecommunications office 18 includes hardware and software associated with transmitting and receiving data between a customer premises and a network, such as network 20. A typical implementation of network 20 is the Internet; however, other networks may be used.

Data are communicated between customer premises equipment 12 through customer premises equipment IDSL router 14 to DSLAM 16 over ISDN lines 22. ISDN lines 22 are digital telephone lines allowing transmission of data in digital form. Communication between customer premises equipment 12, such as a computer, and customer premises equipment IDSL router 14 occurs over line 26, which may take the form of an ethernet cable. An example of line 26 is an ethernet cable. Communication between DSLAM 16 and other portions of central office 18 may occur over line 28. An example of line 28 is an optical interface, connecting DSLAM 16 to other portion of central office 18. Central office 18 communicates with network 20 over line 30, which may include of optical interfaces.

DSLAM 16 includes a plurality of central office IDSL line cards 24. As described in greater detail below, central office IDSL line cards 24 include a plurality of line interfaces, each used to control data communications with a respective customer premises equipment IDSL router 14. According to one embodiment, IDSC line cards 24, include software configured to automatically adjust a bit rate at which the central office IDSL line interface 32 communicates with the associated customer premises equipment IDSL router 14. Such automatic adjustment allows communications within acceptable error levels without manual adjustment of the bit rate setting of the IDSL line interface 32 at the central office. Therefore, the teachings of the invention allow a rapid and cost effective provisioning of IDSL communications.

Additional details on implementation of communications system 10 for communicating data over an ISDN line are described in greater detail below in conjunction with FIGS. 2 through 6. FIGS. 2 through 5 show example structure associated with one embodiment of implementing such a rate adaptive procedure, and FIG. 6 shows a series of steps associated with one example method of automatic rate adaptation.

Figure 2:
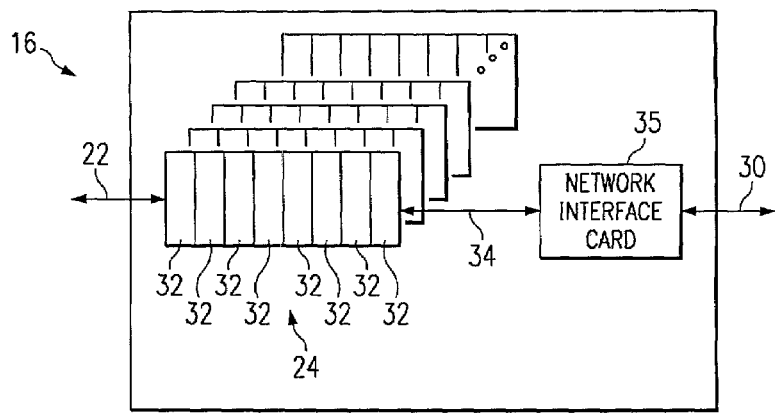
FIG. 2 is a block diagram of the digital subscriber line access multiplexor (DSLAM) shown in FIG. 1.

FIG. 2 is a block diagram of DSLAM 16 showing additional details of the DSLAM. As described above, DSLAM 16 includes a plurality of central office IDSL line cards 24. An example of a central office IDSL line card suitable for use with the present invention is Cisco Model No. ITV-C, available from Cisco Systems. In this example, central office IDSL line card 24 includes eight IDSL line interfaces 32. In this example, each IDSL line interface 32 is associated with one customer premises equipment IDSL router 14 for effecting communication between customer premises equipment 12 and central office 18. Central office IDSL line cards 24, and therefore line interfaces 32, communicate over line 34 with a network interface card 35. Network interface card 35 is well known in the telecommunications industry and provides suitable formatting for providing information along line 30 to network 20 and for receiving data from network 20 over line 30. An example network interface card suitable for use with the present invention is Cisco Model No. NI-2, available from Cisco Systems.

As described above, line interfaces 32 may have different bit rate settings to control the speed at which line interfaces 32 transfer or receive data. The speed of line interface 32 needs to match the associated speed of the customer premises equipment IDSL router 14 associated with customer premises equipment 12 in order for communication between the two to occur within acceptable levels. As described above, according to the teachings of the invention, the bit rate at which line interface 32 is set is adjusted automatically until suitable levels of errors are met. Logic for implementing such a bit rate adaptive procedure is located, in this embodiment, on line card 24, as described in greater detail in conjunction with FIG. 3; however, such logic may be implemented in other locations, such as a personal computer or other suitable location.

Figure 3:
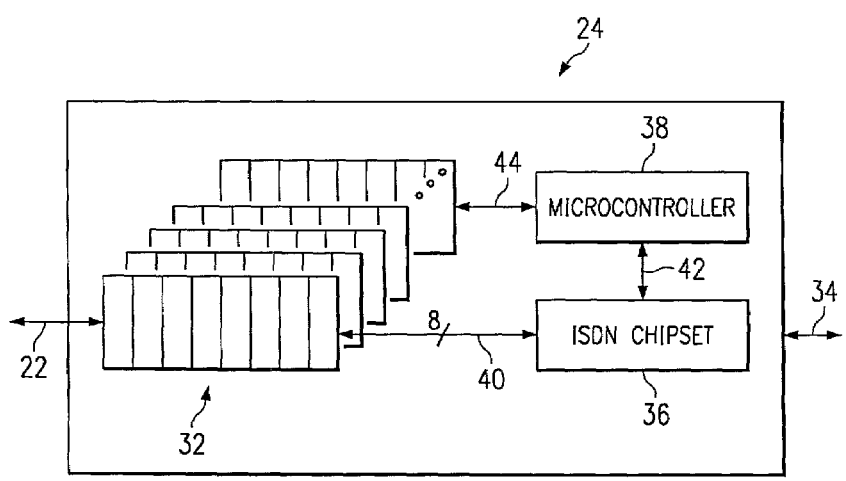
FIG. 3 is a block diagram illustrating an IDSL modem of the DSLAM of FIG. 2.

FIG. 3 is a block diagram of line card 24 illustrated in FIG. 2. As described in conjunction with FIG. 2, line card includes a plurality of ISDN line interfaces 32. In addition, line card 24 includes an ISDN chipset 36 and a microcontroller 38. ISDN chipset 36 is well known in the art and controls communication between customer premises equipment IDSL router 14 and line 22 according to ISDN protocol. Microcontroller 38 controls ISDN chipset 36 and the automatic bit rate adaptation according to the teachings of the invention, as described in greater detail below.

As illustrated, in this example ISDN chipset 36 communicates with line interfaces 32 over line 40, and ISDN chipset 36 communicates with microcontroller 38 over a PCM interface 42. In this manner, microcontroller 38 may communicate with modems 32 through ISDN chipset 36 and thereby effect bit rate adaptation. Alternatively a separate communication link 44 may be provided that allows communication directly between microcontroller 38 and line interfaces 32. Logic for implementing the bit adaptation is contained, in this embodiment, in microcontroller 38, as described in greater detail below in conjunction with FIG. 4.

Figure 4:
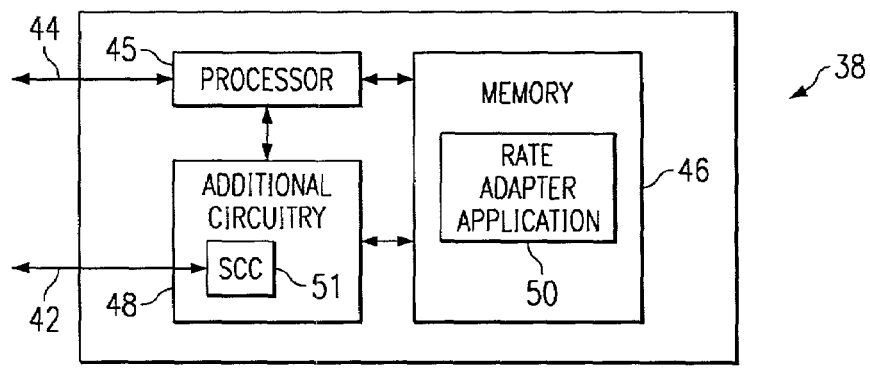
FIG. 4 is a block diagram of a microcontroller on the IDSL modem of FIG. 3.

FIG. 4 is a block diagram of microcontroller 38. An example microcontroller suitable for use with the present invention is a Motorola MPC860P, available from Motorola; however, other suitable microcontrollers may be used. Microcontroller 38 includes a processor 44, a memory area 46, and additional circuitry 48. According to the teachings of the invention, stored in memory location 46 is a rate adapter application 50. Rate adapter application 50 includes suitable logic for automatically adjusting a bit rate of a line interface 32 until suitable error levels are reached. Additional circuitry 48 may include serial communications controller 51 running QMC protocol for communication over PCM interface 42. Example steps associated with rate adapter application 50 are described in greater detail below in conjunction with FIG. 6. Additional details of one example of ISDN chipset 36, which form a part of line card 24, are described below in conjunction with FIG. 5.

Figure 5:
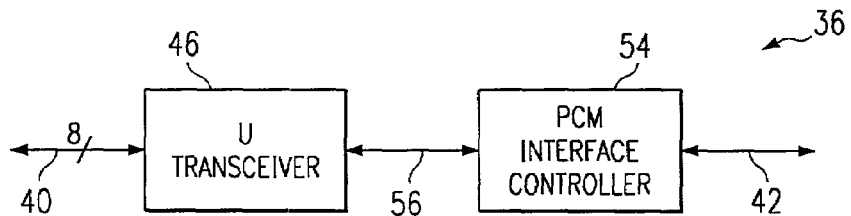
FIG. 5 is a block diagram of an ISDN chipset of FIG. 3.
Figure 6:
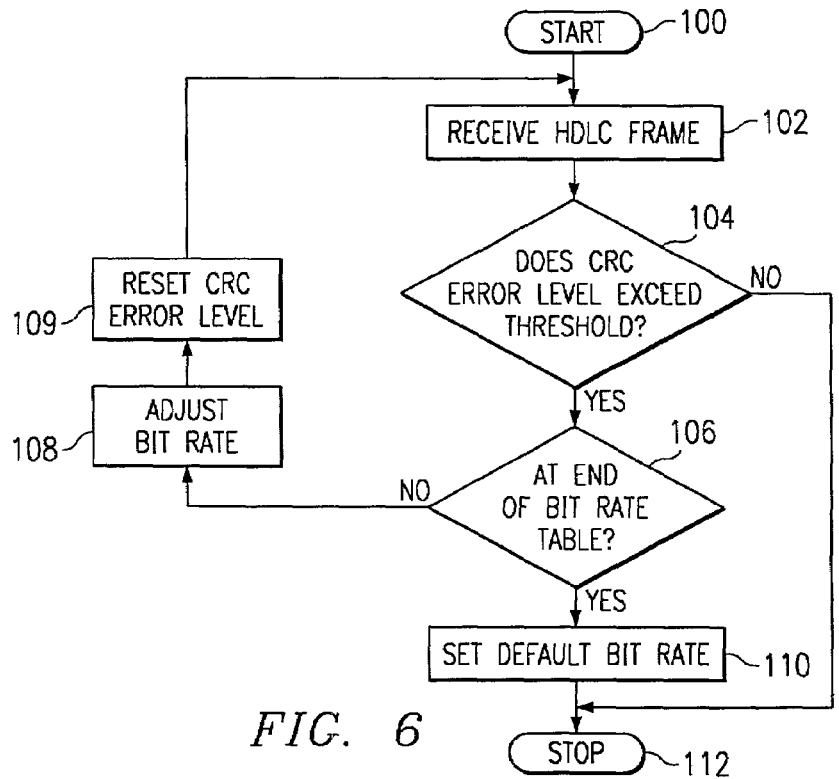
FIG. 6 is a flowchart showing steps performed by the rate adapter of FIG. 4 in automatically adjusting the bit rate of the IDSL line interface of FIG. 3 until acceptable error rates occur, according to the teachings of the invention.

FIG. 5 is a block diagram of ISDN chipset 36 of FIG. 3. ISDN chipset 36 includes U-transceiver 46, which enables full duplex data transmission at the U reference point, line 40. A PCM Interface Controller 54 is also included which provides necessary conversions to transmit/receive data from ISDN chipset 36 over PCM interface 42 to microcontroller 38.

FIG. 6 is a flowchart illustrating example steps associated with automatically adjusting the bit rate of central office line interfaces 32 to match the bit rate of customer premises equipment IDSL router 14. The method is described in the context of rate adapter application executing on microcontroller 38 within line card 24 in this example; however, other hardware and software implementations may be utilized without departing from the scope of the present invention. For example, separate controllers may be utilized to effect such a method or a personal computer connected to line interfaces 32 may be used.

The method begins at step 100. At step 102, an HDLC frame associated with ISDN data communications is received. HDLC refers to High-Level Data Link Control Stream and includes cyclic redundancy check (CRC) data identifying an error level associated with data communications between IDSL routers 14 and line interfaces 32.

At a step 104, a determination is made whether the received CRC error level exceeds a given threshold. The threshold utilized depends upon the level of error acceptable to the customer or to the operator of the central office, or other suitable entity; however, a suitable CRC error level useful for use with the present invention is 2048 bytes. If the error level is acceptable, the process ends at 112; however, if the error level is not acceptable, determination is first made of whether there are any other acceptable bit rates available for line interface 32, at step 106.

As described in greater detail below, one way of determining a subsequent bit rate to try is to access a bit rate table designating the various bit rates that may be applied. A sample bit rate table reproduced below; however, other suitable tables, if tables are used at all, may be used. However, if there are no bit rates left on the access table, determination is made at step 106 that the end of the bit rate table has been met. In such a case, a default bit rate 110 is set and processing ends at step 112. Setting a bit default rate at step 110 may include setting the lowest possible bit rate for line interface 32. If such occurs, manual confirmation of the bit rate of both ISDN router 14 and line interface 32 may be implemented to determine the appropriate bit rate. If a bit rate table has not been exhausted at step 106, the bit rate is adjusted at step 108 and the CRC error level is reset at step 109.

TABLE 1

Sample Bit Rate Table

| Index | Speed (bps) |
|---|---|
| 1 | 56000 |
| 2 | 64000 |
| 3 | 128000 |
| 4 | 144000 |

Adjusting the bit rate generally comprises reducing the bit rate associated with central office line interface 32; however, other schemes may be utilized. For example, instead of using a high bit rate and reducing the bit rate for line interface 32 until an acceptable CRC level is set, a low bit rate may be initially chosen and incremented until the CRC level is exceeded, at which point the previous bit rate that provided data communication within acceptable error levels would be utilized. After adjusting the bit rate of line interface 32 at step 108, data communications proceeds and process continues at step 102 until an appropriate error level is reached.

Although the present invention and its advantages have been described in detail, it should be understood that various changes, substitutions, and alterations can be made therein without departing from the spirit and scope of the present invention as defined by the appended claims.

What is claimed is:

1. An IDSL line card comprising:
   at least one IDSL line interface having an adjustable bit rate comprising:
      a microcontroller operable to control the bit rate associated with the at least one line interface, the microcontroller comprising:
         a processor; and
         a memory associated with the processor and storing a rate adapter application, the rate adapter application operable, when executed on the processor, to:
            receive an error level associated with transfer of data through the at least one IDSL line interface to a second IDSL line interface, the second IDSL line having a second bit rate;
            determine that the received error level exceeds a maximum error level; and
            in response to determining that the maximum error level is exceeded, adjust the bit rate for the at least one IDSL line interface while the second bit rate for the second IDSL interface remains constant and determine that a resulting error level meets or falls below the maximum error level.

2. The line card of claim 1, wherein the error level is a CRC error level.

3. The line card of claim 1, wherein the rate adapter application is further operable to adjust the bit rate, in response to determining that the maximum error level is exceeded, by increasing or decreasing the bit rate.

4. The line card of claim 1, wherein the at least one IDSL line interface comprises eight IDSL line interfaces.

5. The line card of claim 1, wherein the rate adapter application is further operable, when executed on the processor, to access a bit rate table to determine an adjusted bit rate.

6. The line card of claim 1, wherein the rate adapter application is further operable, when executed on the processor, to apply a default bit rate if the error level associated with transfer of data through the at least one IDSL line interface exceeds the maximum error level and has traversed an associated bit rate table.

7. A method for communicating data according to ISDN protocol comprising:
   connecting a first IDSL line interface to a second IDSL line interface, the second IDSL line interface at a location remote from the first IDSL line interface, the first IDSL line interface having a first bit rate, and the second IDSL line interface having a second bit rate;
   transmitting data between the first IDSL line interface and the second IDSL line interface;
   determining that a CRC level associated with the data transfer exceeds a predetermined acceptable level; and
   adjusting the second bit rate while maintaining the first bit rate constant until a CRC level associated with subsequent data transfer between the first and second IDSL line interfaces meets or falls below the predetermined acceptable level.

8. The method of claim 7, wherein connecting a first IDSL line interface to a second IDSL line interface comprises connecting an IDSL line interface at a customer's premises to an IDSL line interface at a telecommunications central office.

9. The method of claim 7, wherein the second IDSL line interface is located at a customer's premises.

10. The method of claim 7, wherein the first IDSL line interface is located at a customer's premises.

11. The method of claim 7, wherein the second IDSL line interface is located within a DSLAM.

12. The method of claim 7, wherein adjusting the second bit rate comprises accessing a bit rate table.

13. The method of claim 7, wherein transmitting data comprises transmitting at least an HDLC frame.

14. A method of establishing data communication according to ISDN protocol comprising:
   connecting a first IDSL line interface to a first end of an ISDN line;
   connecting a second IDSL line interface to a second end of the ISDN line;
   setting a bit transfer rate of the first IDSL line interface to a first bit rate;
   setting a bit transfer rate of the second IDSL line interface to a second bit rate;
   transmitting data between the first and second IDSL line interfaces;
   determining a CRC level associated with the data transmission;
   comparing the determined CRC level to an acceptable error level;
   adjusting the bit transfer rate of the second IDSL line interface while maintaining constant the bit rate for the first IDSL line interface in response to at least a determination based on the comparison that the CRC level associated with the data transmission exceeds the acceptable error level; and
   repeating the steps of transmitting data, determining a CRC level, comparing the determined CRC level, and adjusting the bit transfer rate until the determined CRC level equals or falls below the threshold level.

15. The method of claim 14, wherein connecting the first IDSL line interface connecting the first IDSL line interface to a first end of an ISDN line comprises connecting an IDSL line interface located at a customer's premises to the first end of an ISDN line.

16. The method of claim 14, wherein connecting the first IDSL line interface to a first end of an ISDN line comprises connecting an IDSL line interface located remote from a customer's premises to the first end of an ISDN line.

17. The method of claim 14, wherein adjusting the bit transfer rate comprises accessing a bit rate table.

18. The method of claim 14, wherein transmitting data comprises transmitting at least an HDLC frame.

19. The method of claim 14, wherein adjusting the bit transfer rate of the second IDSL line interface comprises adjusting, by the second IDSL line interface, the bit transfer rate of the second IDSL line interface.

20. The method of claim 14, wherein adjusting the bit transfer rate of the second IDSL line interface comprises adjusting, by a computer located remote from the second IDSL line interface, the bit transfer rate of the second IDSL line interface.

21. A system for facilitating communication of data according to ISDN protocol comprising:
   a first IDSL means located proximate a first location and a second IDSL means located proximate a second location for modulating and demodulating data exchanged between the first and second locations;
   a line means connecting the first IDSL means and the second IDSL means for carrying data exchanged between the first and second locations according to ISDN protocol; and
   a controller means for determining that data exchanged between the first and second IDSL means has an associated error level that exceeds a desired level and in response adjusting a bit rate associated with the second IDSL means while maintaining constant a bit rate associated with the first IDSL means until the associated error level reaches or falls below a threshold level.

22. An IDSL line card comprising:
   at least one line interface;
   an ISDN chipset electrically connected to each of the at least one line interface;
   a microcontroller electrically connected to the ISDN chipset, the microcontroller comprising:
     a processor; and
     a memory associated with the processor and storing a rate adapter application, the rate adapter application operable, when executed on the processor to:
     receive data received by one of the at least one line interface from a second line interface, the data including an error indication;
     determine that an error level is exceeded; and
     in response to determining that the maximum error level is exceeded, adjust the bit rate of the the at least one line interface from which data are received to a different bit rate while maintaining constant a bit rate associated with the second line interface.

23. A system for facilitating communication of data comprising:
   first and second ISDN line interfaces; and
   a controller comprising:
     a memory; and
     a rate adapter program stored in the memory, the rate adapter program operable to determine that data exchanged between the first and second IDSL line interfaces has an associated error level that exceeds a desired level and in response adjust a bit rate associated with the first IDSL line interface while maintaining constant a bit rate associated with the second IDSL line interfaces until the associated error level reaches or falls below a threshold level.

24. The system of claim 23, wherein the controller comprises a personal computer.

25. The system of claim 23, wherein the controller comprises a microcontroller stored on a line card, the line card also storing the first IDSL line interface.

* * * * *